US012762378B2

(12) United States Patent
Dong et al.

(10) Patent No.: US 12,762,378 B2
(45) Date of Patent: Oct. 13, 2026

(54) DUAL ENCODER RETRIEVAL EFFICIENCY WITH PARAMETER SHARING IN PROJECTION LAYER

(71) Applicant: Google LLC, Mountain View, CA (US)

(72) Inventors: Zhe Dong, Zurich (CH); Jianmo Ni, Santa Clara, CA (US); Imed Zitouni, Zug (CH); Enrique Alfonseca, Mountain view, CA (US); Daniel Martin Bikel, Mountain View, CA (US); Chen Qu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 762 days.

(21) Appl. No.: 18/299,841

(22) Filed: Apr. 13, 2023

(65) Prior Publication Data

US 2024/0346290 A1 Oct. 17, 2024

(51) Int. Cl.
*G06N 3/0455* (2023.01)
*G06F 17/16* (2006.01)
(Continued)

(52) U.S. Cl.
CPC ........... *G06N 3/0455* (2023.01); *G06F 17/16* (2013.01); *G06F 40/279* (2020.01); (Continued)

(58) Field of Classification Search
CPC ...... G06N 20/00; G06N 3/0455; G06N 3/045; G06N 3/09; G06N 3/084; G06N 3/08; G06N 3/0464; G06N 5/04; G06N 3/082; G06F 40/284; G06F 40/30; G06F 17/16; G06F 40/279
See application file for complete search history.

(56) References Cited

U.S. PATENT DOCUMENTS

2019/0347523 A1* 11/2019 Rothberg ............... G06N 3/084
2021/0256069 A1* 8/2021 Grail ................. G06F 16/90332
(Continued)

OTHER PUBLICATIONS

Liu et al., NPL ("Point2Token: A Multi-Tagging Answer Retrieval Framework for Question Answering" Published 2021 by IEEE, 5 pages (Year: 2021).*
(Continued)

*Primary Examiner* — Quoc A Tran
(74) *Attorney, Agent, or Firm* — Botos Churchill IP Law

(57) ABSTRACT

Aspects of the technology provide systems and methods for implementing an asymmetric dual encoder architecture. The architecture includes a token embedder layer section having a first token embedding section associated with a first input and a second token embedding section associated with a second input, and an encoder layer section having a first encoder section receiving token embeddings from the first token embedding section and a second encoder section receiving token embeddings from the second token embedding section. A shared projection layer receives encodings from both the first and second encoder sections and generates a set of projections. An embedding space is configured, based on the set of projections, to generate a question embedding and an answer embedding, in which the question and answer embeddings are used in identifying a set of candidate answers to an input answer.

21 Claims, 16 Drawing Sheets
(5 of 16 Drawing Sheet(s) Filed in Color)

(51) Int. Cl.

| | |
|---|---|
| ***G06F 40/279*** | (2020.01) |
| ***G06F 40/284*** | (2020.01) |
| ***G06F 40/30*** | (2020.01) |
| ***G06N 3/045*** | (2023.01) |
| ***G06N 3/0464*** | (2023.01) |
| ***G06N 3/08*** | (2023.01) |
| ***G06N 3/082*** | (2023.01) |
| ***G06N 3/084*** | (2023.01) |
| ***G06N 3/09*** | (2023.01) |
| ***G06N 5/04*** | (2023.01) |
| ***G06N 20/00*** | (2019.01) |

(52) U.S. Cl.

CPC ............ *G06F 40/284* (2020.01); *G06F 40/30* (2020.01); *G06N 3/045* (2023.01); *G06N 3/0464* (2023.01); *G06N 3/08* (2013.01); *G06N 3/082* (2013.01); *G06N 3/084* (2013.01); *G06N 3/09* (2023.01); *G06N 5/04* (2013.01); *G06N 20/00* (2019.01)

(56) References Cited

U.S. PATENT DOCUMENTS

2024/0111794 A1* 4/2024 Osuala ................ G06F 16/3323
2024/0134597 A1* 4/2024 Dontcheva ............ G06F 3/0484

OTHER PUBLICATIONS

Olabanji Shonibare NPL ("ASBERT: Siamese and Triplet network embedding for open question answering" Published 2021, 10 pages (Year: 2021).*

Chen, Danqi , "Reading Wikipedia to Answer Open-Domain Questions", Proceedings of the 55th Annual Meeting of the Association for Computational Linguistics, pp. 1870-1879 Vancouver, Canada, Jul. 30-Aug. 4, 2017, Association for Computational Linguistics.

Chopra, Sumit , et al., "Learning a Similarity Metric Discriminatively, with Application to Face Verification", Courant Institute of Mathematical Sciences New York University, New York, NY, 2005, pp. 1-8.

Dehghani, Mostafa , et al., "Neural Ranking Models with Weak Supervision", SIGIR '17, Aug. 7-11, 2017, Shinjuku, Tokyo, Japan 2017 Copyright held by the owner/author(s). 978-1-4503-5022-8/17/08. DOI: 10.1145/3077136.3080832, pp. 1-10.

Devlin, Jacob , et al., "BERT: Pre-training of Deep Bidirectional Transformers for Language Understanding", arXiv:1810.04805v2 [cs.CL] May 24, 2019, pp. 1-16.

Dong, Zhe , et al., "Exploring Dual Encoder Architectures for Question Answering", arXiv:2204.07120v1 [cs.CL] Apr. 14, 2022, pp. 1-5.

Dong, Zhe , et al., "Exploring Dual Encoder Architectures for Question Answering", arXiv:2204.07120v2 [cs.CL] Nov. 15, 2022, pp. 1-6.

Dong, Zhe , et al., "Exploring Dual Encoder Architectures for Question Answering", Proceedings of the 2022 Conference on Empirical Methods in Natural Language Processing, pp. 9414-9419 Dec. 7-11, 2022 Association for Computational Linguistics.

Gillick, Daniel , et al., "End-to-End Retrieval in Continuous Space", arXiv:1811.08008v1 [cs.IR] Nov. 19, 2018, pp. 1-6.

Raffel, Colin , et al., "Exploring the Limits of Transfer Learning with a Unified Text-to-Text Transformer", Journal of Machine Learning Research 21 (2020) 1-67.

Reimers, Nils , et al., "Sentence-BERT: Sentence Embeddings using Siamese BERT-Networks", Proceedings of the 2019 Conference on Empirical Methods in Natural Language Processing and the 9th International Joint Conference on Language Processing, pp. 3982-3992,Hong Kong, China, 2019. Association for Computational Linguistics.

International Search Report and Written Opinion for corresponding International Application PCT/US2023/023831 dated Jan. 3, 2024 (14 pages).

Le, Hang , et al., "Dual-decoder Transformer for Joint Automatic Speech Recognition and Multilingual Speech Translation", arXiv:2011.00747v1 [cs.CL] Nov. 2, 2020, 14 pgs.

Xia, Yingce , et al., "Model-Level Dual Learning", Proceedings of the 35th International Conference on Machine Learning, Stockholm, Sweden, PMLR 80, 2018. Copyright 2018, 10 pgs.

* cited by examiner

FIG. 5

Table 1

| Metric | Model | MSMARCO | NQ | SQuAD | TriviaQA | HotpotQA | SearchQA |
|---|---|---|---|---|---|---|---|
| P@1 | SDE | **15.92** | 48.87 | **70.13** | 36.55 | **34.36** | 36.40 |
| | ADE | 14.20 | 47.83 | 60.39 | 31.30 | 26.71 | 39.48 |
| | ADE-STE | 14.71 | 48.29 | 61.05 | 33.59 | 28.71 | 40.43 |
| | ADE-FTE | 14.23 | 49.38 | 62.86 | 35.11 | 29.07 | **42.06** |
| | ADE-SPL | 15.46 | **50.06** | 69.39 | **38.17** | 33.66 | 41.13 |
| | BERT-DE | - | 36.22 | 55.13 | 29.11 | 32.05 | 30.2 |
| | USE-QA | - | 38 | 66.83 | 32.58 | 31.71 | 31.45 |
| MRR | SDE | **28.49** | 61.15 | **78.44** | 49.29 | 45.58 | 54.26 |
| | ADE | 26.31 | 59.38 | 70.33 | 43.42 | 37.27 | 55.02 |
| | ADE-STE | 26.78 | 59.81 | 70.85 | 45.79 | 39.14 | 56.08 |
| | ADE-FTE | 26.64 | 61.23 | 72.18 | 46.95 | 39.72 | 57.44 |
| | ADE-SPL | 28.20 | **61.92** | 77.65 | **50.3** | 44.19 | **57.48** |
| | BERT-DE | - | 52.02 | 64.74 | 41.34 | **46.21** | 47.08 |
| | USE-QA | - | 52.27 | 75.86 | 42.39 | 43.77 | 50.7 |

600

ADE-STE

ADE-FTE

ADE-SPL

FIG. 8

Table 2

| Model | SDE | ADE | A-STE | A-FTE | A-SPL | D-G7 | D-G127 |
|---|---|---|---|---|---|---|---|
| Top-5 | 62.2 | 57.6 | 58.0 | 57.4 | **62.7** | 51.1 | 55.8 |
| Top-20 | **77.0** | 73.2 | 73.1 | 73.8 | 76.4 | 69.1 | 73.0 |
| Top-100 | **84.6** | 82.7 | 82.5 | 83.2 | 84.4 | 80.8 | 83.1 |

FIG. 9

Table 3

| Metric | Top-5 | | | Top-20 | | | Top-100 | | |
|---|---|---|---|---|---|---|---|---|---|
| Model Size | small | base | large | small | base | large | small | base | large |
| SDE | **54.63** | 62.24 | 67.51 | **70.00** | **76.98** | 79.92 | **80.28** | **84.57** | **86.93** |
| ADE | 46.32 | 57.65 | 62.88 | 62.58 | 73.21 | 76.93 | 74.99 | 82.69 | 85.35 |
| ADE-STE | 48.03 | 58.03 | 64.04 | 64.85 | 73.07 | 77.84 | 76.57 | 82.55 | 85.21 |
| ADE-FTE | 50.50 | 57.40 | 63.74 | 67.51 | 73.80 | 77.26 | 78.45 | 83.19 | 85.32 |
| ADE-SPL | 53.52 | **62.66** | **68.06** | 68.48 | 76.37 | **80.25** | 79.11 | 84.40 | 86.23 |

FIG. 11

Table 4

| Metric | P@1 | | | MRR | | |
|---|---|---|---|---|---|---|
| **Model Size** | small | base | large | small | base | large |
| SDE | **14.50** | **15.92** | **16.53** | **25.76** | **28.49** | 29.63 |
| ADE | 13.31 | 14.20 | 14.17 | 23.89 | 26.31 | 26.99 |
| ADE-STE | 12.99 | 14.71 | 15.14 | 23.78 | 26.78 | 27.61 |
| ADE-FTE | 13.67 | 14.23 | 14.73 | 24.51 | 26.64 | 27.40 |
| ADE-SPL | 14.31 | 15.46 | 16.42 | 25.53 | 28.20 | **29.70** |

1300

DUAL ENCODER RETRIEVAL EFFICIENCY WITH PARAMETER SHARING IN PROJECTION LAYER

BACKGROUND

Natural language processing ("NLP") tasks such as question answering or other information retrieval typically rely upon a language model that has been pre-trained on world knowledge. Large language models ("LLMs") such as Bidirectional Encoder Representations from Transformers ("BERT") and Text-to-Text Transfer Transformer ("T5") can capture a large amount of world knowledge, acquired from a text corpus on which they are trained. Some models use a dual encoder arrangement. This type of architecture employs two encoders, each of which encodes an input (such as a piece of text) into an embedding. Here, the model is optimized based on similarity metrics in the embedding space.

Two such dual encoder arrangements are a Siamese dual encoder (SDE), and an asymmetric dual encoder (ADE). In the SDE approach, parameters are shared across the two encoders. The ADE approach uses two distinctly parameterized encoders, where only some or no parameters are shared. These dual encoder approaches may provide excellent performance in a wide range of information retrieval and question answering tasks. They are also suitable in products because the embedding index of dual encoders can grow dynamically for newly discovered or updated documents and passages without retraining the encoders. In contrast, generative neural networks used for question answering need to be retrained with new data. This advantage makes dual encoders more robust to freshness. However, how the parameter sharing is done in a given dual encoder arrangement can significantly impact model performance, and, ultimately, the usefulness of the information provided in response to a query.

BRIEF SUMMARY

The technology explores enhanced ADE architectures as compared to baseline SDE and ADE arrangements. This includes evaluation of parameter sharing in different components of dual encoders on question answering tasks in order to provide more effective representation learning. The encoder components include the token embedder, transformer encoder, and projection layer. As discussed below, ADE-type dual encoders are constructed with parameter sharing at different levels between the two encoders. In one aspect, shared projection layers are shown to provide noticeable improvements in the retrieval quality of the model. This can be particularly beneficial, by way of example, for question answering-type scenarios. Given a question q and a corpus of answer candidates A, the goal is to retrieve k relevant answers $A_k \in A$ for q. The answers may be, e.g., a passage, sentence or a phrase.

According to one aspect of the technology, a computer-implemented asymmetric dual encoder system is provided that comprises a token embedder layer section, an encoder layer section, a projection layer, and an embedding space. The token embedder layer section has a first token embedding section associated with a first input and a second token embedding section associated with a second input. The encoder layer section has a first encoder section configured to receive token embeddings from the first token embedding section and a second encoder section configured to receive token embeddings from the second token embedding section. The projection layer is configured to receive encodings from both the first and second encoder sections and to generate a set of projections. The projection layer is shared by the asymmetric dual encoder system. The embedding space is configured, based on the set of projections, to generate a question embedding and an answer embedding. The question and answer embeddings are used in identifying a set of candidate answers to an input answer. The first input may be a question and the second input may be an answer.

In an example, the first and second token embedding sections may be distinctly parameterized. Alternatively or additionally, the first and second encoder sections may be distinctly parameterized. Alternatively or additionally, the asymmetric dual encoder system is configured to receive input from a mixed-input source, in which a first type of input from the mixed-input source is received by the first token embedding section and a second type of input from the mixed-input source is received by the second token embedding section. Here, the first type of input may comprise text while the second type of input does not include text. The second type of input may include at least one of imagery or audio. Alternatively or additionally, the second type of input may include a structured form.

The first and second token embedding sections may be initialized from a same set of pre-trained parameters, but fine-tuned separately. The dual encoder system may be trained by optimizing contrastive loss with an in-batch sampled soft-max. Here, cosine distance may be used as a similarity function for the contrastive loss. Alternatively or additionally, during training the projection layer may be randomly initialized.

According to another aspect, a method implementing an asymmetric dual encoder is provided. The method comprises: receiving a first input by a first token embedding section and a second input by a second token embedding section, the first and second token embedding sections forming a token embedding layer of the asymmetric dual encoder; concurrently generating first token embeddings by the first token embedding section and second token embeddings by the second token embedding section; receiving the first token embedding at a first encoder section and receiving the second token embeddings at a second encoder section, the first and second encoder sections forming an encoder layer section of the asymmetric dual encoder; concurrently generating first encodings by the first encoder section and second encodings by the second encoder section; receiving, at a shared projection layer of the asymmetric dual encoder system, the first and second encodings; generating, by the shared projection layer, a set of projections according to the first and second encodings; and generating, in an embedding space based on the set of projections, a question embedding and an answer embedding, the question and answer embeddings for use in identifying a set of candidate answers to an input answer. The method may further comprise providing one or more of the set of candidate answers responsive to the input answer, for instance to a client device to present the one or more candidate answers in response to a query.

In one example, the first and second token embedding sections are distinctly parameterized. In another example, the first and second encoder sections are distinctly parameterized. In a further example, the first and second token embedding sections are distinctly parameterized, and the first and second encoder sections are also distinctly parameterized.

The first and second token embedding sections may be initialized from a same set of pre-trained parameters, but are fine-tuned separately. The dual encoder system may be trained by optimizing contrastive loss with an in-batch sampled soft-max. During training the projection layer may be randomly initialized.

According to a further aspect, a non-transitory recording medium is provided having instructions stored thereon. The instructions, when executed by one or more processors of a computing system, implement an asymmetric dual encoder comprising a token embedder layer section, an encoder layer section, a projection layer and an embedding space. The token embedder layer section has a first token embedding section associated with a first input and a second token embedding section associated with a second input. The encoder layer section has a first encoder section configured to receive token embeddings from the first token embedding section and a second encoder section configured to receive token embeddings from the second token embedding section. The projection layer is configured to receive encodings from both the first and second encoder sections and to generate a set of projections. The projection layer is shared by the asymmetric dual encoder system. The embedding space is configured, based on the set of projections, to generate a question embedding and an answer embedding, the question and answer embeddings for use in identifying a set of candidate answers to an input answer.

BRIEF DESCRIPTION OF THE DRAWINGS

FIG. 5 presents a table comparing performance of different dual encoder arrangements in accordance with aspects of the technology.

FIG. 8 presents a table evaluating different dual encoders, measured for retrieval accuracy according to the Open Domain Natural Questions data set.

FIG. 9 presents a table evaluating the scaling effects for different dual encoders on the Open Domain Natural Questions data set.

FIG. 11 presents a table evaluating the scaling effect on various retrieval tasks for different dual encoder architectures.

The patent or application file contains at least one drawing executed in color. Copies of this patent or patent application publication with color drawing(s) will be provided by the Office upon request and payment of the necessary fee.

DETAILED DESCRIPTION

The technology relates to systems and methods that employ neural network models having dual encoder architectures, which utilize parameter sharing to enhance operational performance of the models. These models may be used in a wide variety of applications and scenarios.

Figure 1:
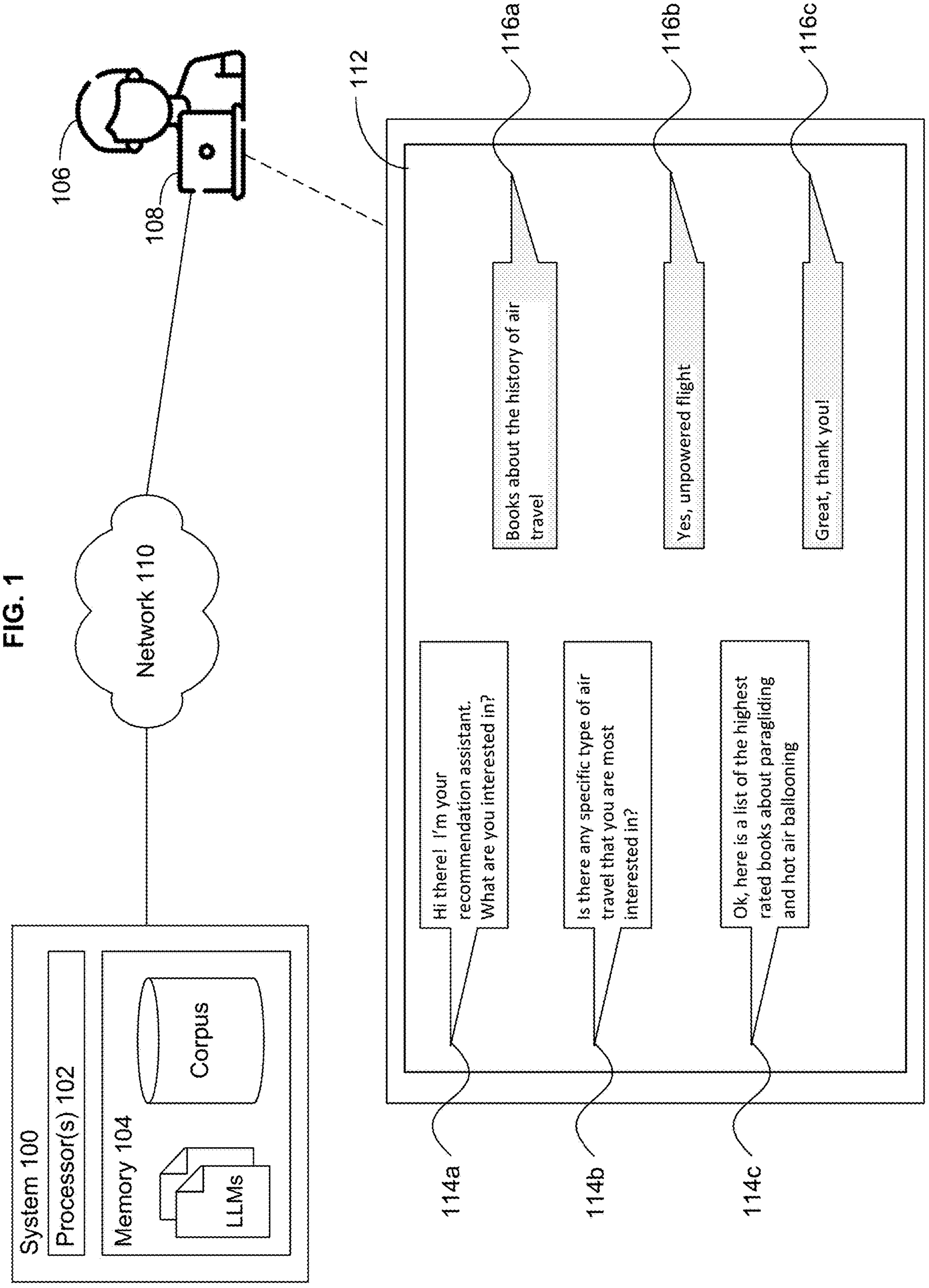
FIG. 1 illustrates an example system and sample question answering interaction in accordance with aspects of the technology.

For instance, FIG. 1A illustrates an example involving a question answering system 100 for handing user queries and other input. This can be applicable to users for on-line searching, book or news recommendations, shopping, etc. The system 100 may include one or more processors 102 and memory 104 for storing data. In one example, the memory 104 may store one or more trained LLMs. A user 106 can formulate a query or other input on their client device 108, which may be, e.g., a laptop or desktop computer, a tablet PC, a mobile phone or PDA, a smartwatch, a smart home appliance, smart devices on automobiles, etc. The query is sent to the system 100 via a network 110. The system applies an LLM to the query in view of an information corpus. It may interact with the user via one or more turns in a conversation in order to select and/or recommend certain content. The user input and system commentary may be presented via the app displayable to the user 106 on a graphical user interface (GUI) 112 of the user's client device 110 and/or audibly via a speaker.

In this example, the interaction between the system and the user can help to refine a set of suggested content based on the user's interest. Exemplary dialogue between the system (e.g., 114*a*, 114*b* and 114*c*) and the user (e.g., 116*a*, 116*b* and 116*c*) is illustrated. Each dialogue element 114 or 116 constitutes a turn in the conversation. In this example, the user may be interested in books about air travel. By asking targeted questions, the system is able to refine the query and then generate a set of recommendations for presentation to the user. For instance, in this example, the initial query may be refined across several turns to determine that the user is most interested in books about the history of air travel with regard to unpowered flight. Based on this, the system may generate a list of relevant books regarding paragliding and hot air ballooning.

Example Systems and Methods

As noted above, one or more LLMs may be employed in the system 100. While there are a number of different possible system configurations, they each incorporate LLMs. According to one aspect, LLMs based on an encoder approach, such as the Transformer architecture, may be employed.

General Transformer Architecture

Figure 2:
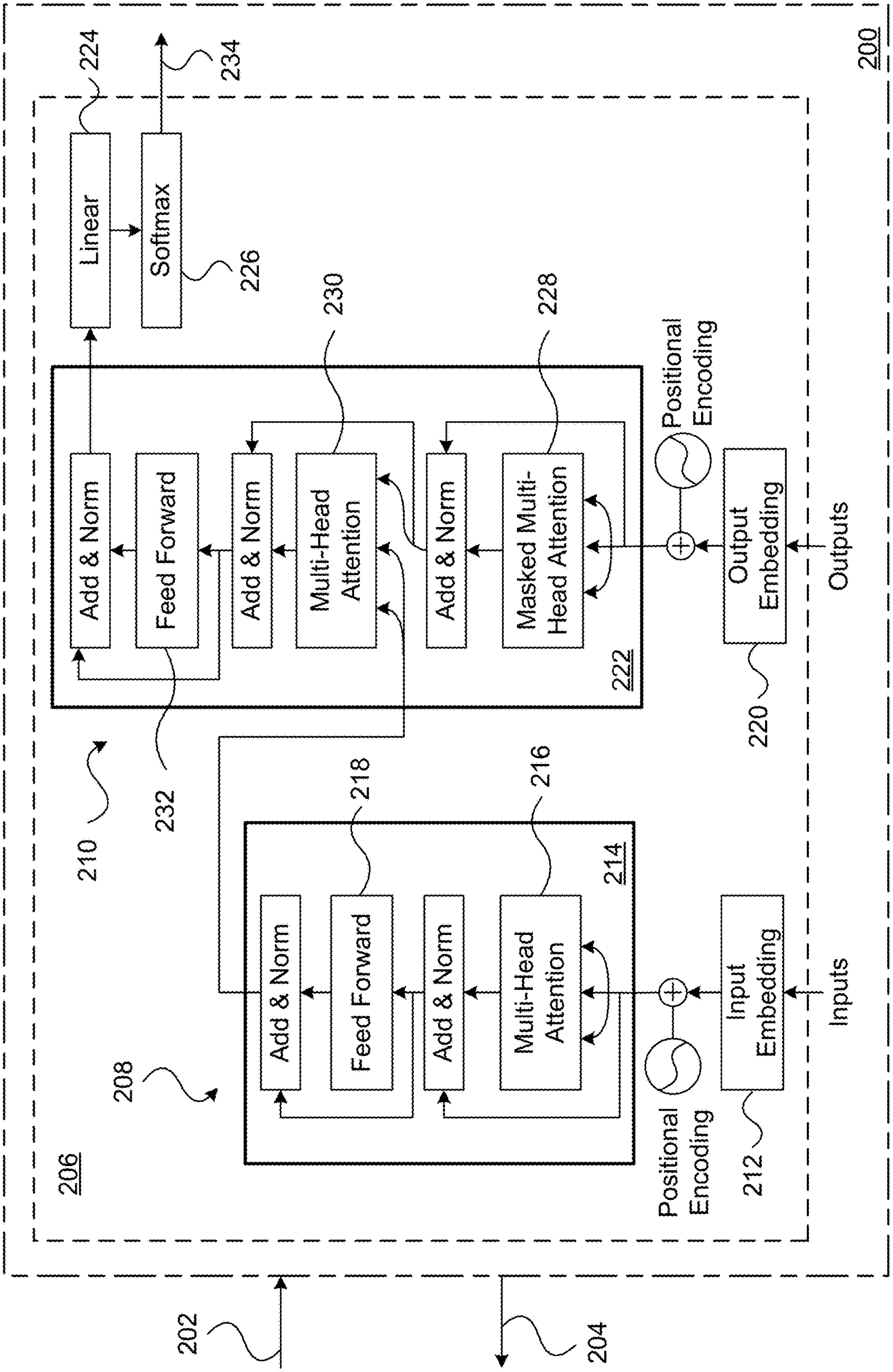
FIG. 2 (Prior Art)
FIG. 2 illustrates a Transformer-type architecture for use in accordance with aspects of the technology.

By way of example only, a general Transformer architecture is presented in FIG. 2. In particular, system 200 of FIG. 2 is implementable via a computer program by processors of one or more computers in one or more locations. The system 200 receives an input sequence 202 (e.g., a query) and processes the input sequence 202 to transduce the input sequence 202 into an output sequence 204 (e.g., an answer). The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The input sequence can be tokenized and then the tokens are embedded by the embedding layer. For instance, tokenization can involve splitting input text such as a sentence or a paragraph into chunks (e.g., individual words) referred to as tokens.

The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an "Add & Norm" operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution, to output final result 204.

According to aspects of the technology, variations on the Transformer-type architecture can be used. These may include T5, Bidirectional Encoder Representations from Transformers (BERT), Language Model for Dialogue Applications (LaMDA), and/or Pathways Language Mode (PaLM) type architectures. Different types of models may be used for each encoder path in the dual encoder arrangement.

Dual Encoder Approaches

In models employing dual encoder architectures, each encoder encodes arbitrary inputs that may differ in type or granularity, such as queries, images, answers, passages, or documents, by way of example. The model has two encoders, where each is a transformer that encodes a question or an answer. Each encoder first produces a fixed-length representation for its input and then applies a projection layer to generate the final embedding.

Figure 3A:
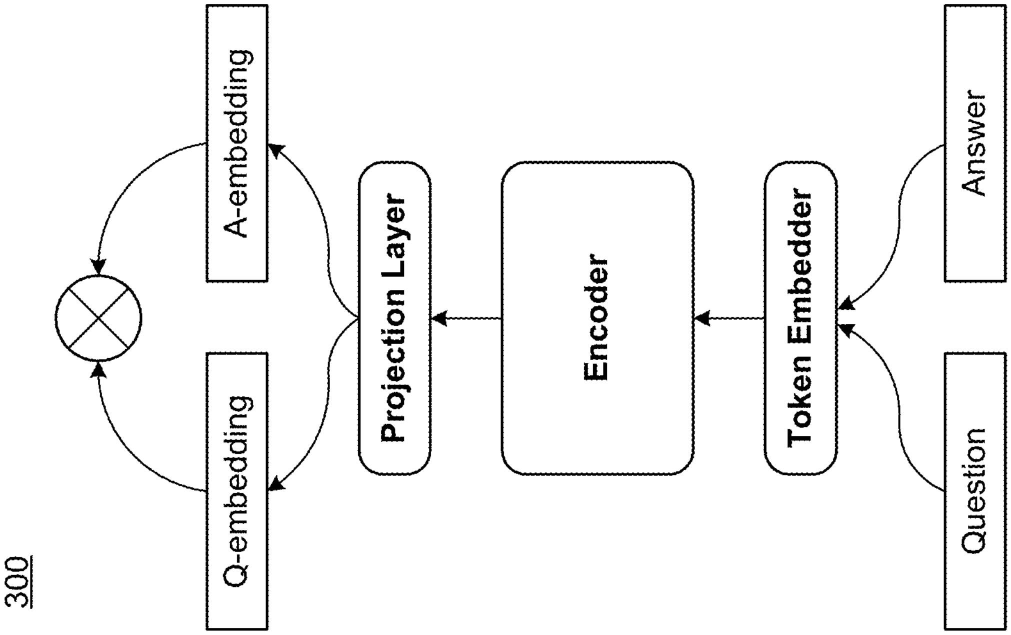
FIG. 3A illustrates a Siamese dual encoder and FIG. 3B illustrates an asymmetric dual encoder in accordance with aspects of the technology.
Figure 3B:
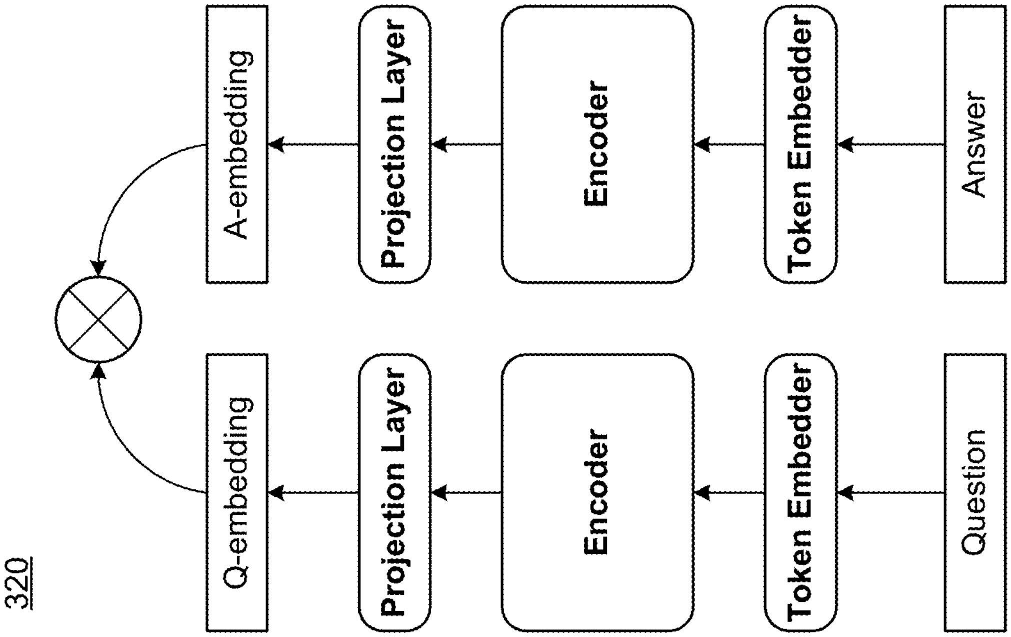

As noted above, there are different types of dual encoder arrangements that can be used with LLMs. One is the Siamese dual encoder, an example of which (300) is shown in FIG. 3A. Another is the asymmetric dual encoder, an example of which (320) is shown in FIG. 3B. As shown in FIGS. 3A and 3B, both arrangements include a token embedder layer, an encoder layer, a projection layer and an embedding space.

A text string may be converted into a vector via a dictionary, in which sub-tokens (e.g., words or sub-words such as syllables) are created and then mapped to vectors that are applied to the encoder layer. The output of encoder layer passes to projection layer, and the set of projections output of the projection layer is passed to the embedding space for question embedding ("Q-embedding") and answer embedding ("A-embedding"). The output from the model may include a set of relevant answers to the input question.

In the SDE encoder 300, parameters are shared between the two encoding paths (or "towers") for the question and the answer. In the ADE encoder 320, each encoding path is distinctly parameterized for the question and the answer. The SDE encoder 300 approach, with maximal parameter sharing, may outperform the ADE encoder 320 approach where no parameters are shared. However, some applications may require certain asymmetry in the dual encoding paths, as multi-modal information may need an asymmetric encoder. By way of example, asymmetry may be necessary when there is a mixed-input source such as a webpage with different types of content such as text, imagery, audio, ads, structured forms, etc. Another example is to use a small tower for query encoding and a much larger tower for answer encoding. Here, for instance, answer encoding can be performed offline, where a more robust, heavier encoder could be used to obtain high-quality embeddings. In comparison, query encoding may be performed online, so a lighter encoder can be used to provide faster responses.

Figure 4A:
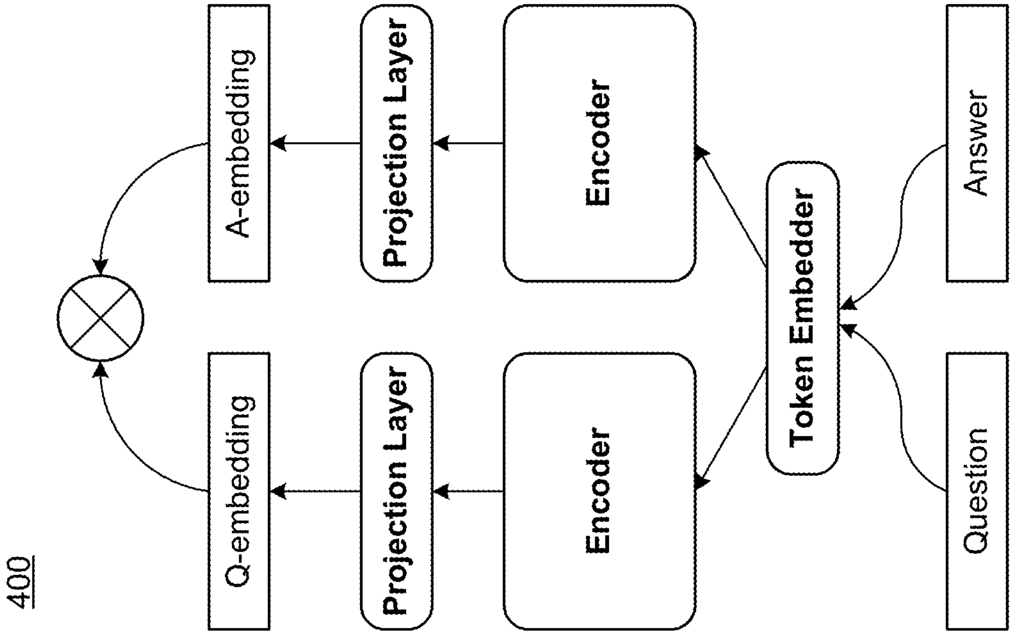
FIGS. 4A-C illustrate examples of asymmetric dual encoders in accordance with aspects of the technology.
Figure 4B:
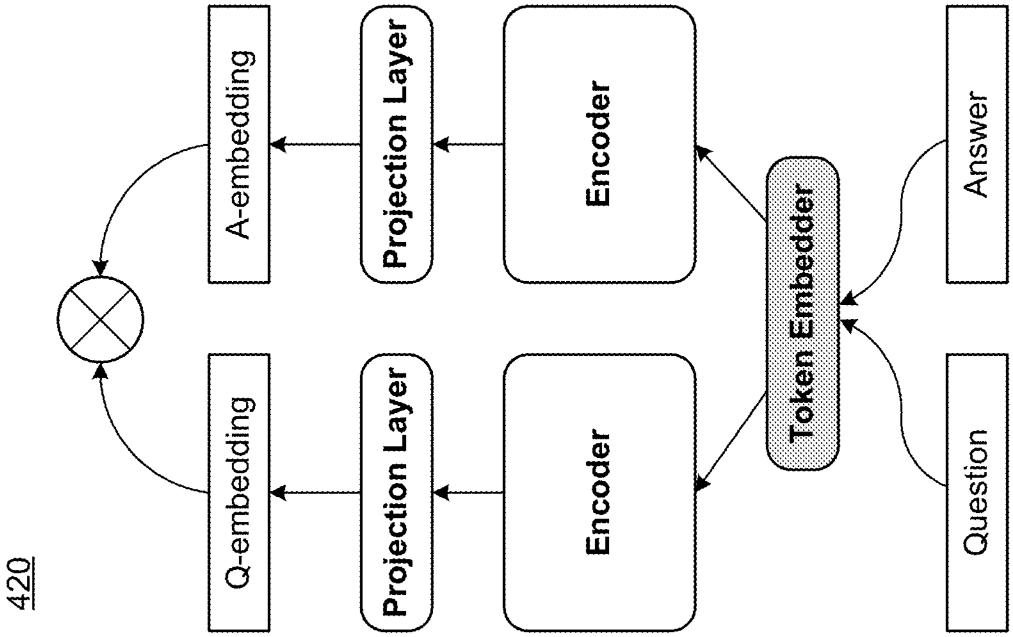
Figure 4C:
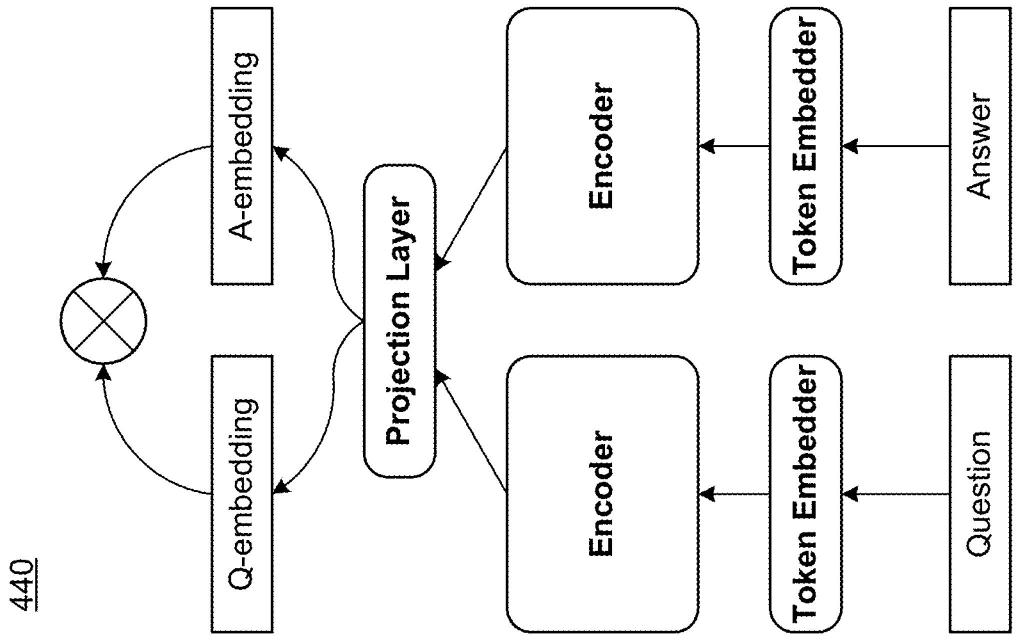

FIGS. 4A-C illustrate three variations of the general ADE encoder 320, where parameters are shared in different parts of the model. In particular, example 400 of FIG. 4A is an ADE-type encoder having a shared token embedder between the two encoding paths. Here, the encoders and projection layers are distinctly parameterized. Example 420 of FIG. 4B is similarly arranged, but with the shared token embedder being frozen. In this variation, the token embedding is frozen during fine-tuning.

Token embedders are the lowest layers close to the input text. In ADEs, token embedders are initialized from the same set of pre-trained parameters, but fine-tuned separately. One way to bring ADEs closer to SDEs in terms of performance is to share the token embedders between the two towers, as in the arrangement of FIG. 4A, or alternatively, to simply freeze the token embedders during training as in the arrangement of FIG. 4B.

Example 440 of FIG. 4C is an ADE-type encoder with a common projection layer but no sharing at the other layers. Here, the token embedders and encoders are distinctly parameterized. How parameters are shared in each arrangement may have a significant impact on how well an LLM is able to perform a particular task.

It has been found that sharing parameters in token embedders and projection layers between the two encoders improves the efficacy of the ADE architecture. In particular, sharing the projection layer as in example 440 of FIG. 4C enables that ADE architecture to achieve performance results comparable to or even better than the performance results for an SDE. As discussed further below, an analysis of the embeddings was performed for the various arrangements by projecting and clustering them into 2-dimensional space using a variation of stochastic neighbor embedding (SNE) called t-SNE, which is discussed, for instance, in "Visualizing data using t-sne" by van der Maaten et al., in the Journal of Machine Learning Research (2008).

The analysis has shown that without sharing projection layer, ADEs tend to embed the inputs of the two encoder towers into disjoint embedding spaces, which may hinder the quality of retrieval. In contrast, projection layer sharing can significantly boost system performance.

According to one aspect of the technology, the dual encoder model is trained by optimizing the contrastive loss with an in-batch sampled soft-max according to:

$$\mathcal{L} = \frac{e^{sim(q_i,a_i)/\tau}}{\sum_{i\in\mathcal{B}} e^{sim(q_i,a_j)/\tau}}$$

where $q_i$ is a question and a* is a candidate answer, ai is ground-truth answer, or a positive sample, for $q_i$. All other answers $a_j$ in the same batch $\mathcal{B}$ are considered as negative samples during training. $\tau$ is the softmax temperature and sim is a similarity function to measure the relevance between the question and the answer. In one scenario, cosine distance may be used as the similarity function according to:

$$sim(q_i, a_j) = \frac{\vec{q}_i \cdot \vec{a}_j}{\|\vec{q}_i\| \, \|\vec{a}_j\|}$$

Testing and Analysis

The dual encoder architectures of FIGS. 4A-C were evaluated on six question-answering retrieval tasks from MS MARCO (see, e.g., "Ms macro: A human generated machine reading comprehension dataset" by Nguyen et al., 2016) and MultiReQA (see, e.g., "MultiReQA: A crossdomain evaluation forRetrieval question answering models by Guo et al., 2021). In MS MARCO, testing considered the relevant passages as answer candidates, while for the five QA datasets in MultiReQA the answer candidates were individual sentences. The testing further validated the conclusion on an open domain questionanswering task, Open Domain NaturalQuestions, where the retrieval candidates are context passages.

To initialize the parameters of dual encoders, pre-trained T5 1.1 encoders were employed (see, e.g., "Exploring the limits of transfer learning with a unified text-to-text transformer" by Raffel et al., 2020). The average embeddings of the T5 encoder's outputs were taken and sent to a projection layer to get the final embeddings. The projection layers were randomly initialized, with variance scaling initialization with scale 1.0. For the retrieval, mean embeddings were used from the encoder towers. To make a fair comparison, the same hyper-parameters were applied across all the models for the fine-tuning with Adafactor optimizer (see, e.g., "Adafactor: Adaptive learning rates with sublinear memory cost" by Shazeer and Stern, 2018), using learning rate $10^{-3}$ and batch size 512. The models were fine-tuned for 20,000 steps, with linear decay of learning rate from $10^{-3}$ to 0 at the final steps. The fine-tuned models were benchmarked with precision at 1 (P@1) and mean reciprocal rank (MRR) on the QA retrieval tasks.

The results from this are shown in Table 1 of FIG. 5, where performance of an SDE architecture (see 300 in FIG. 3A) is compared against a general ADE architecture without parameter sharing (see 320 in FIG. 3B). ADE-STE, ADE-FTE and ADE-SPL are the ADEs with shared token-embedders (400 in FIG. 4A), frozen token-embedders (420 in FIG. 4B), and shared projection-layers (440 in FIG. 4C), respectively. Two other models were evaluated, BERT-DE, which stands for BERT Dual-Encoder (see, e.g., "BERT: Pre-training of deep bidirectional transformers for language understanding" by Devlin et al., 2019), and USE-QA (see, e.g., "Multilingual universal sentence encoder for semantic retrieval" by Yang et al., 2020), which were the baselines reported in MultiReQA referenced above. In this table, results are reported for precision at 1(P@1)% and Mean Reciprocal Rank (MRR) % on QA retrieval tasks. The most performant models are marked in bold.

SDE and ADE are the two most distinct dual-encoders in terms of parameter sharing. The experiment results in Table 1 show that, on QA retrieval tasks, ADE performs consistently worse than SDE. This may be understood because at inference time, the two distinct encoders in ADE that do not share any parameters, map the questions and the answers into two parameter spaces that are not perfectly aligned. However, for SDE, parameter sharing enforces the embeddings from the two encoders to be in the same space.

As noted above, there are situations where asymmetry in the dual encoders is necessary, or otherwise desirable depending on the task to be performed. Thus, the ADE-TE, ADE-FTE and ADE-SPL arrangements may be particularly beneficial. Evaluated on MS MARCO and MultiReQA, the results in Table 1 show that both freezing (ADE-FTE, as in 420 of FIG. 4B) and sharing (ADE-STE, as in 400 of FIG. 4A) token embedders bring consistent improvements for ADEs. The ADE-SPL arrangement (440 in FIG. 4C) presents another way of improving retrieval quality of ADEs, which is to share the projection layers between the two encoders. Table 1 shows that sharing projection layers significantly improves the quality of ADEs.

Figure 6:
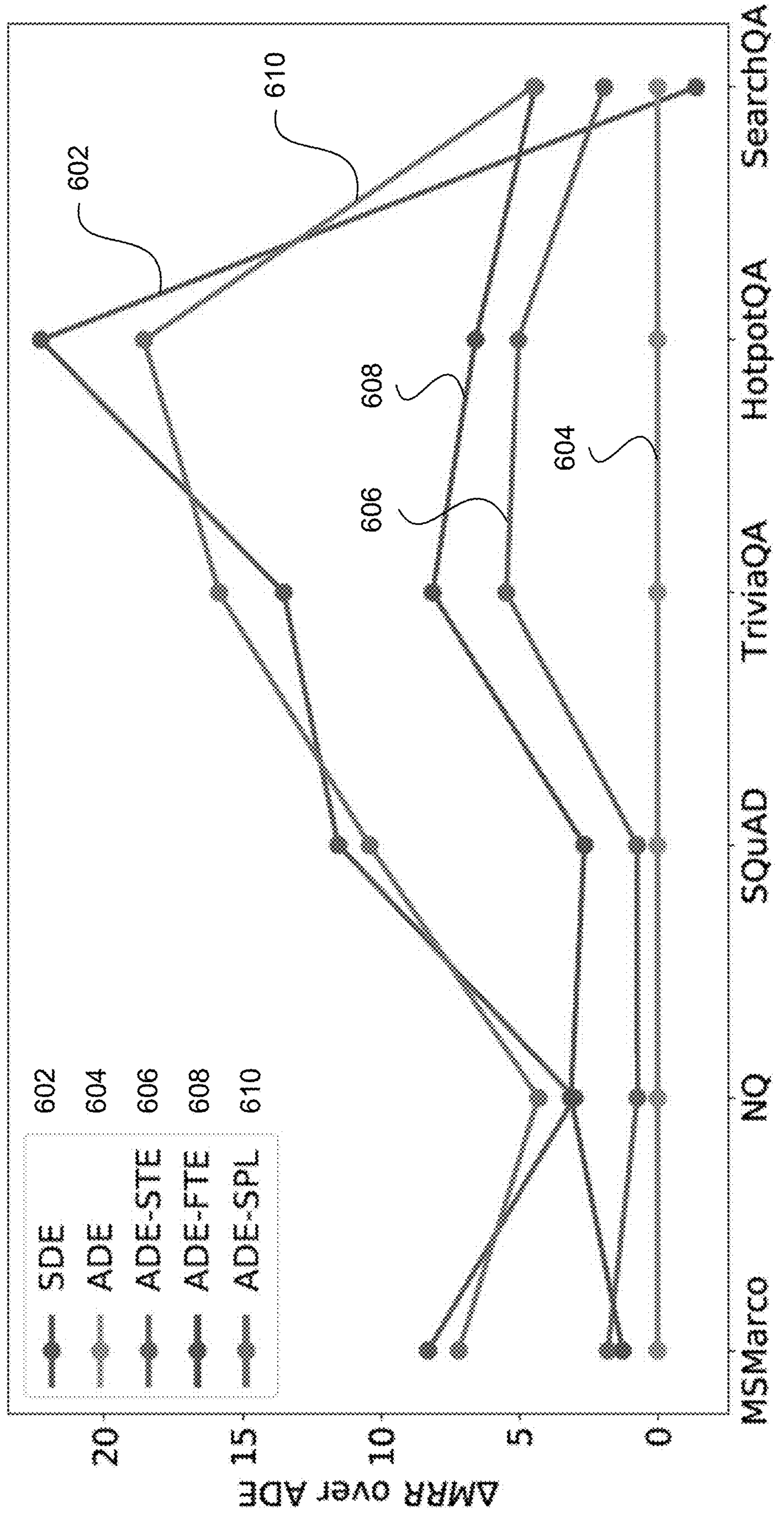
FIG. 6 illustrates a chart for relative performance improvements of different dual encoder models on QA retrieval tasks in accordance with aspects of the technology.
Figure 7B:
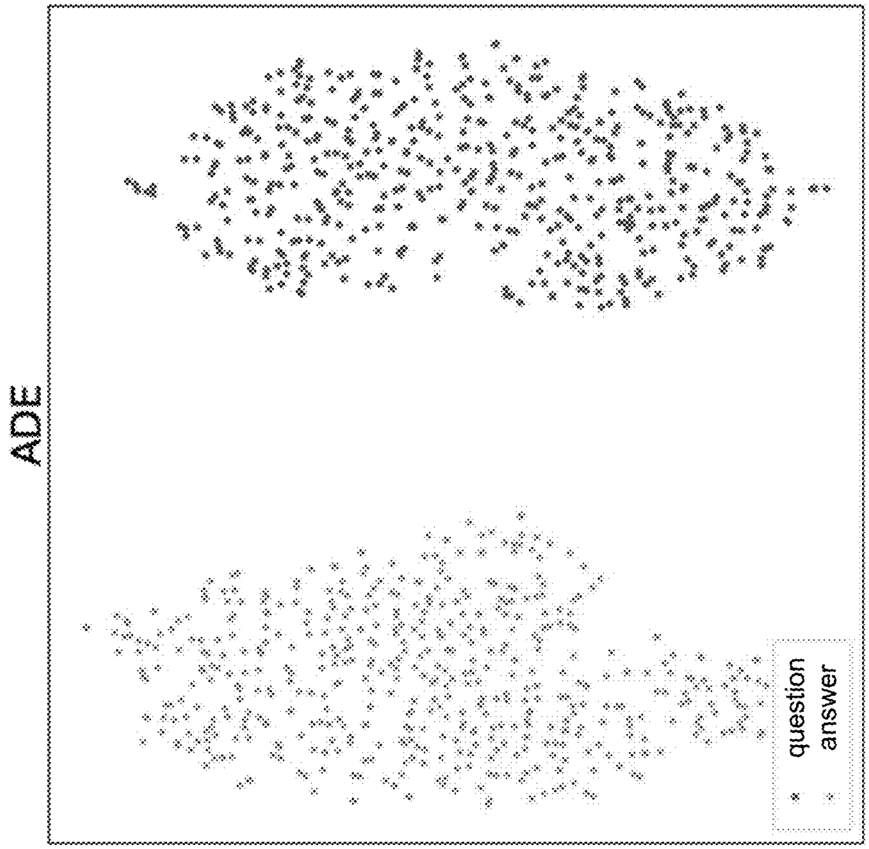
FIGS. 7A-E graphically present clustered question and answer results for different dual encoder models in accordance with aspects of the technology.
Figure 7A:
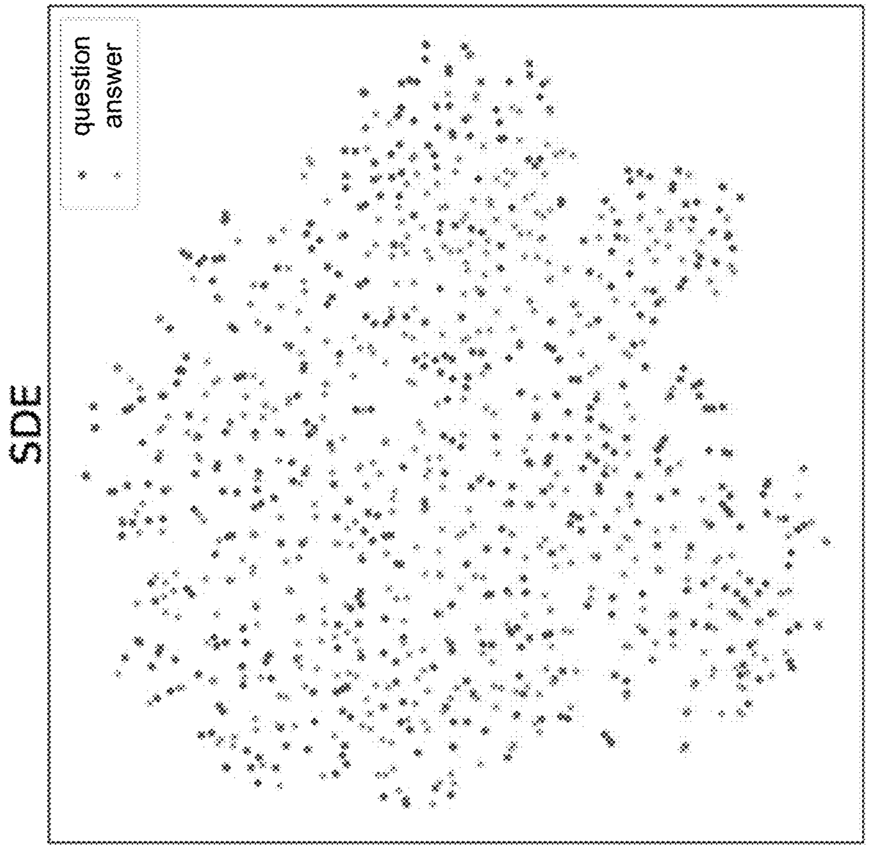
Figure 7C:
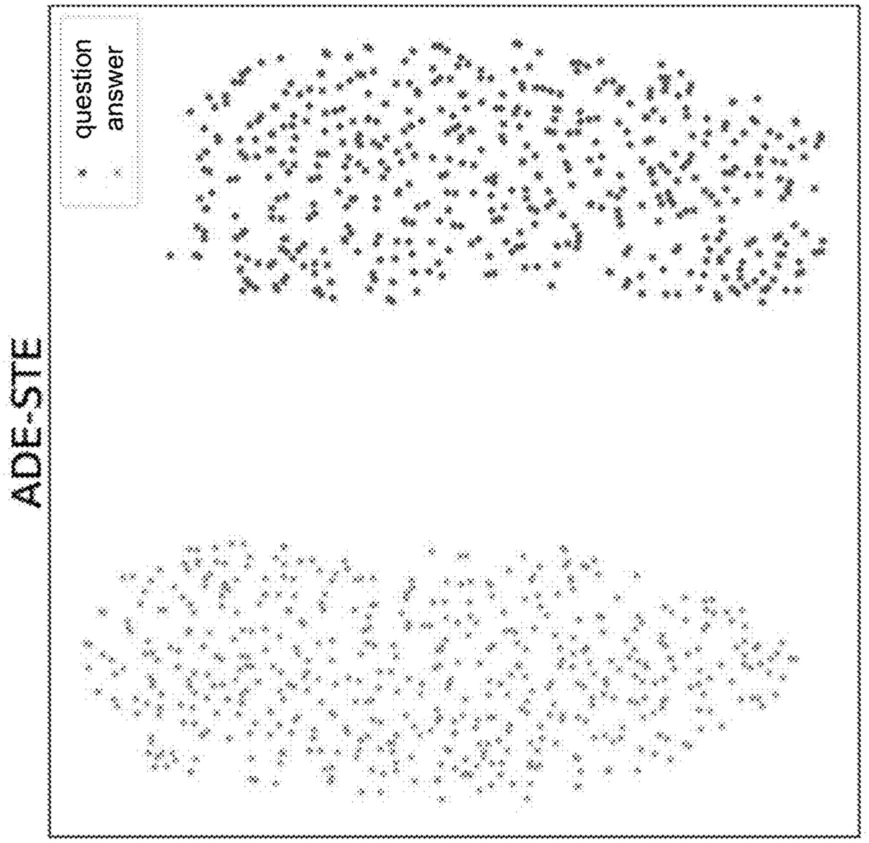
Figure 7D:
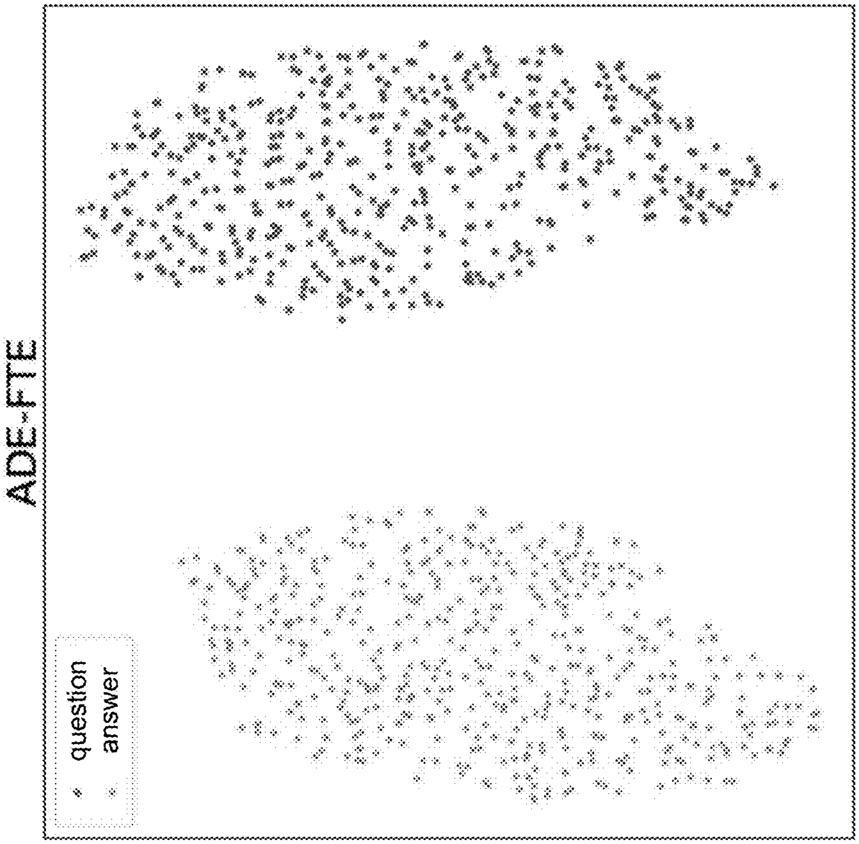
Figure 7E:
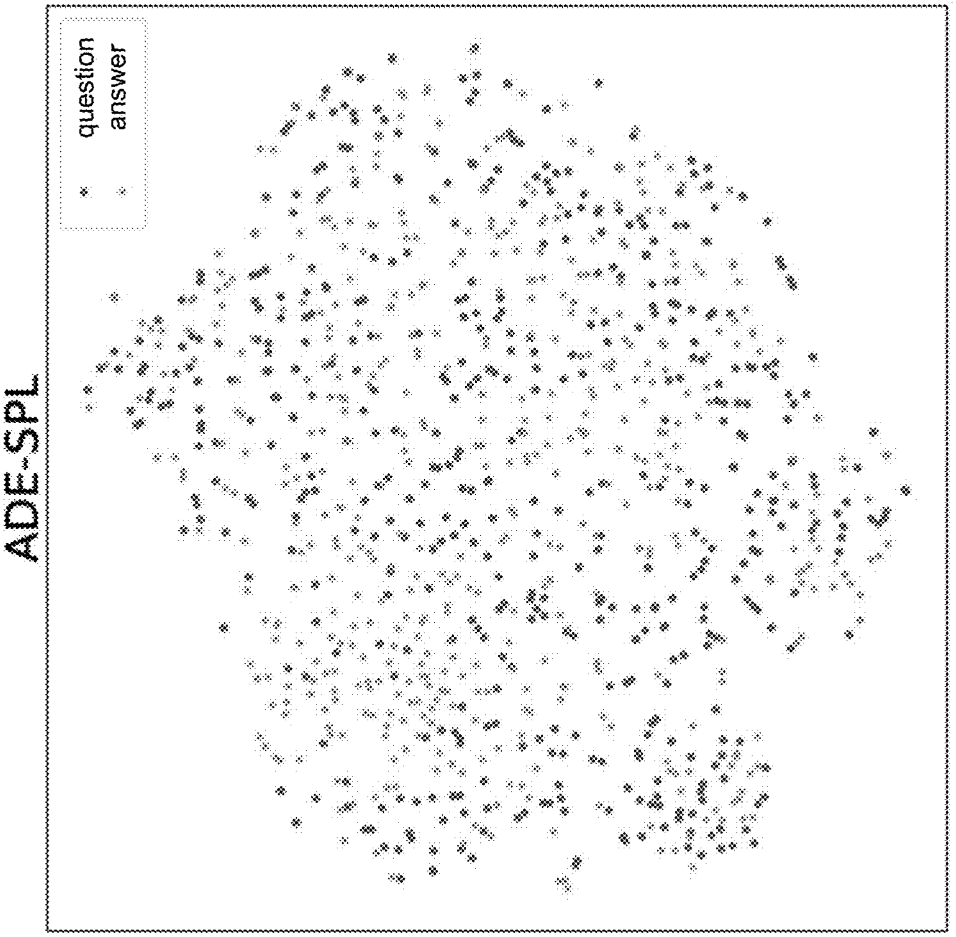

FIG. 6 illustrates a chart 600 for relative performance improvements of different models relative to ADE on QA retrieval tasks. Here, $\Delta MRR=(MRR-MRR_{ADE})/MRR_{ADE})\times 100$. As in FIG. 6, ADE-SPL (curve 610) performs on-par and, sometimes, even better than SDE (curve 602). This observation reveals that sharing projection layers is a valid and beneficial approach to enhance the performance of the model.

To further substantiate the results, the question and answer embeddings were first generated from the NaturalQuestions eval set, and then t-SNE (see, e.g., "Visualizing data using t-sne" referenced above) was used to project and cluster the embeddings into 2-dimensional space. For efficiently clustering with t-SNE, questions and answers were randomly sampled (400 each), from the NQ eval set. FIGS. 7A-E graphically present question and answer results for SDE, ADE, ADE-STE, ADE-FTE and ADE-SPL, respectively. It can be seen that, for ADE, ADE-STE and ADE-FTE that have separate projection layers, the question and answer embeddings are projected and clustered into two disjoint groups. In comparison, ADE-SPL that shares the projection layers, the embeddings of questions and answers are not separable by t-SNE, which is similar to the behavior of SDE. This verifies that the projection layer plays an important role in bringing together the representations of questions and answers, and may be a key for retrieval performance.

Table 2 of FIG. 8 presents results of an evaluation of different dual encoders, measured as top-k retrieval accuracy on Open Domain Natural Questions (development set). The baselines are derived from DRP (see, e.g., "Dense passage retrieval for open-domain question answering" by Karpukhin et al., 2020) with golden labels and 7 (D-G7) or 127 (D-G127) negative examples. This evaluation was done using the top-k accuracy ($k\in\{5, 20, 100\}$). As shown, the SDE and ADE-SPL approaches perform competitively on the OpenQA passage retrieval task.

Figure 10A:
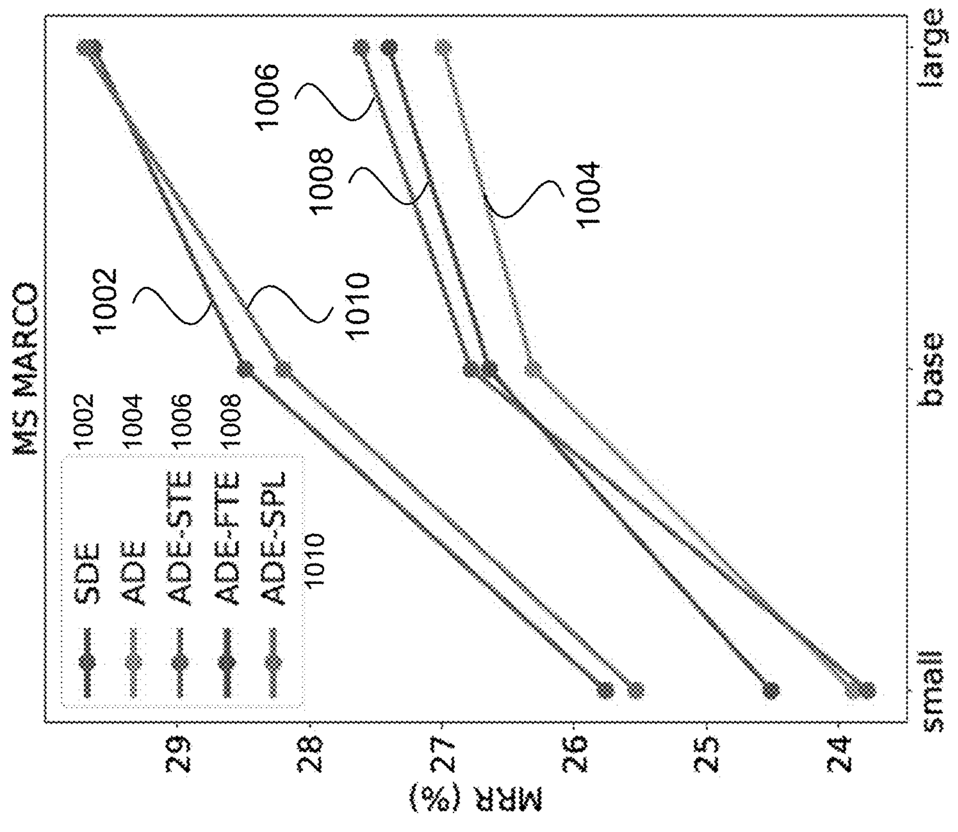
FIGS. 10A-B are plots of the impact of model size on the performance of different dual encoder architectures.
Figure 10B:
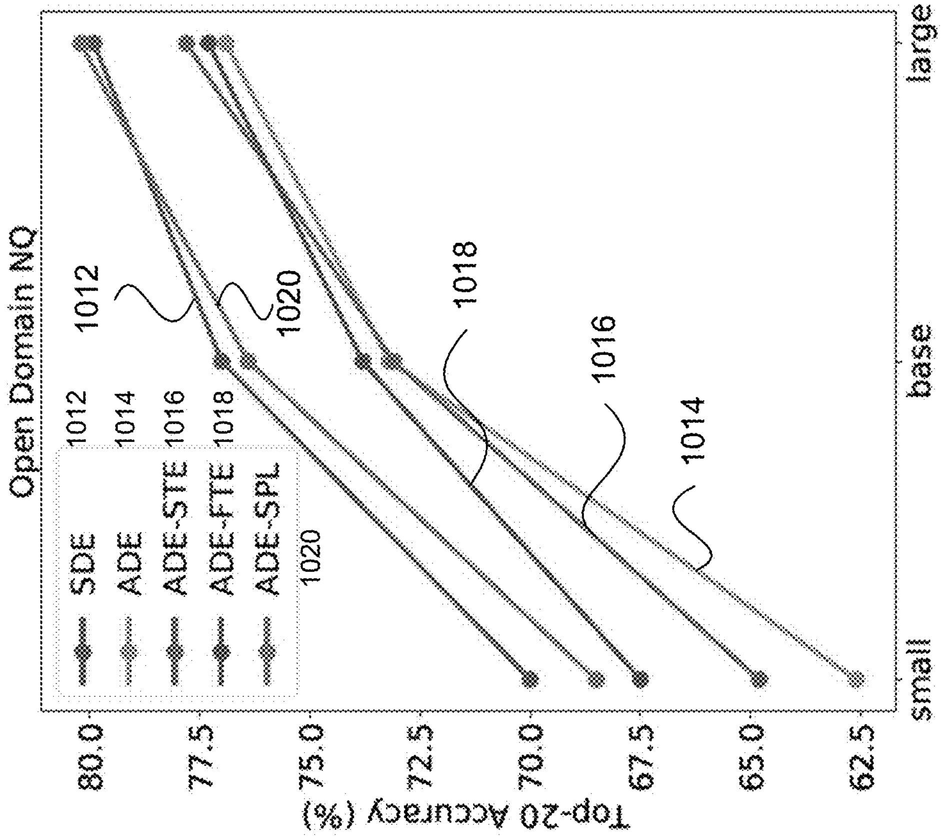

To assess the impact of model size, the dual-encoders were fine-tuned and evaluated with initialization from T5 1.1 -small (approximately 77 million parameters), -base (approximately 250 million), and -large (approximately 800 million) on MS MARCO and OpenNQ. Table 3 in FIG. 9, the plots in FIGS. 10A-B, and Table 4 in FIG. 11 show that, across different model sizes, sharing projection layers consistently improved the retrieval performance of ADE, and ADE-SPL performed competitively with SDE (see 1010 v 1002 in FIG. 10A, and 1020 v 1012 in FIG. 10B). In particular, Table 3 presents an evaluation of the scaling effect on Open Domain Natural Questions, using top-k retrieval accuracy, with dual encoders initialized from T5 1.1 -small, -base, and -large checkpoints. The most performant models are bolded. In FIGS. 10A-B, the impact of model size on the performance of different dual encoder architectures is illustrated, measured by MRR on the eval set of MS MARCO (FIG. 10A), and Top-20 Accuracy on development set of Open Domain NQ (FIG. 10B). And Table 4 presents an evaluation of the scaling effect on MS MARCO QA retrieval tasks, using Precision at 1 (P@1) % and Mean Reciprocal Rank (MRR) %, with dual encoders initialized from T5 1.1 -small, -base, and -large checkpoints. The most performant models are also bolded in this table.

Example Computing Architecture

Figure 12A:
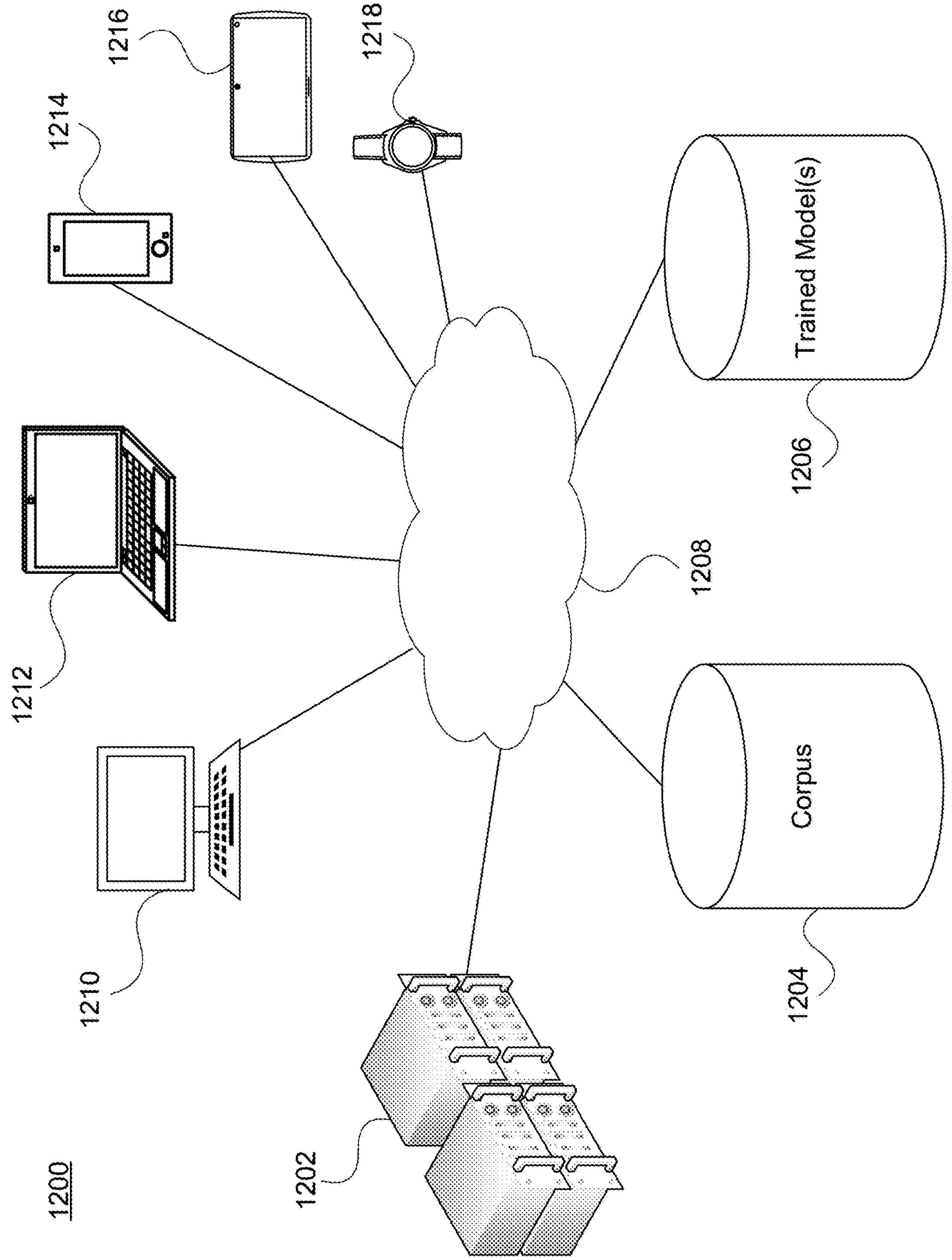
FIGS. 12A-B illustrate a system for use with aspects of the technology.
Figure 12B:
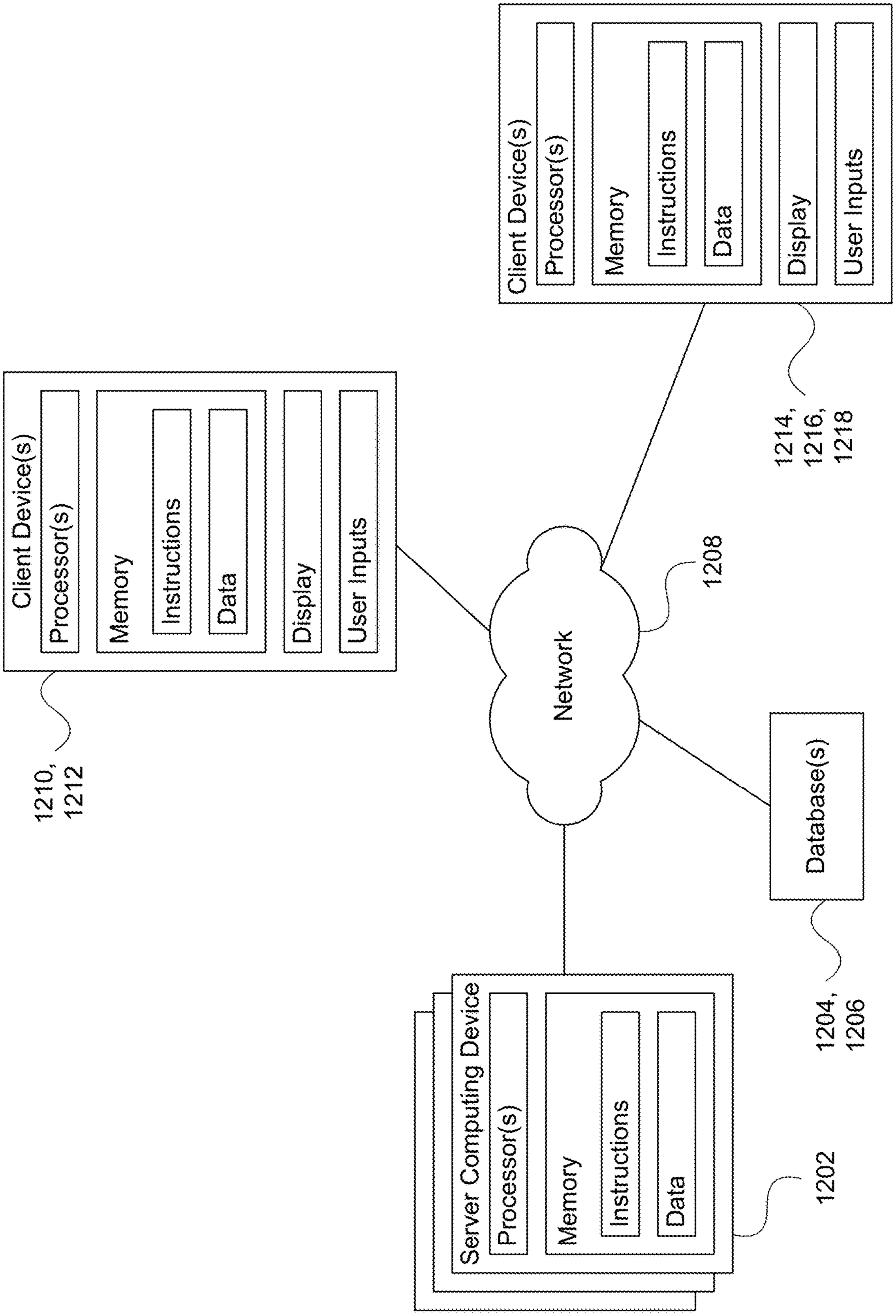

The dual encoder technology discussed herein may be trained on one or more tensor processing units (TPUs), CPUs or other computing in accordance with the features disclosed herein. One example computing architecture is shown in FIGS. 12A and 12B. In particular, FIGS. 12A and 12B are pictorial and functional diagrams, respectively, of an example system 1200 that includes a plurality of computing devices and databases connected via a network. For instance, computing device(s) 1202 may be implemented as a cloud-based server system. Databases 1204, and 1206 may store, e.g., a corpus of answer candidates and/or trained image models, respectively. The server system may access the databases via network 1208. Client devices may include one or more of a desktop computer 1210 and a laptop or tablet PC 1212, for instance that present a particular question from a user, and/or to view the answer(s) provided by the system in accordance with a given dual encoder arrangement as discussed here, which could be provided to the user via a web-based service, app or other program. Other client devices may include handheld devices including a personal communication device such as a mobile phone or PDA 1214 or a tablet 1216. Another example is a wearable device 1218 such as a smartwatch (or head-mounted display device).

As shown in FIG. 12B, each of the computing devices 1202 and 1210-1218 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms “instructions”, “modules” and “programs” may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 12B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1202. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery, videos and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 1210-1218) may communicate with a back-end computing system (e.g., server 1202) via one or more networks, such as network 1208. The network 1208, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1202 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1202 may include one or more server computing devices that are capable of communicating with any of the computing devices 1210-1218 via the network 1208. The computing device 1202 may implement a back-end server (e.g., a cloud-based question answering server), which receives queries from desktop computer 1210, laptop/tablet PC 1212, mobile phone or PDA 1214, tablet 1216 or wearable device 1218.

Resultant information (e.g., answers to one or more questions) or other data derived from the approaches discussed herein may be shared by the server with one or more of the client computing devices. Alternatively or additionally, the client device(s) may maintain their own databases, models, etc.

Figure 13:
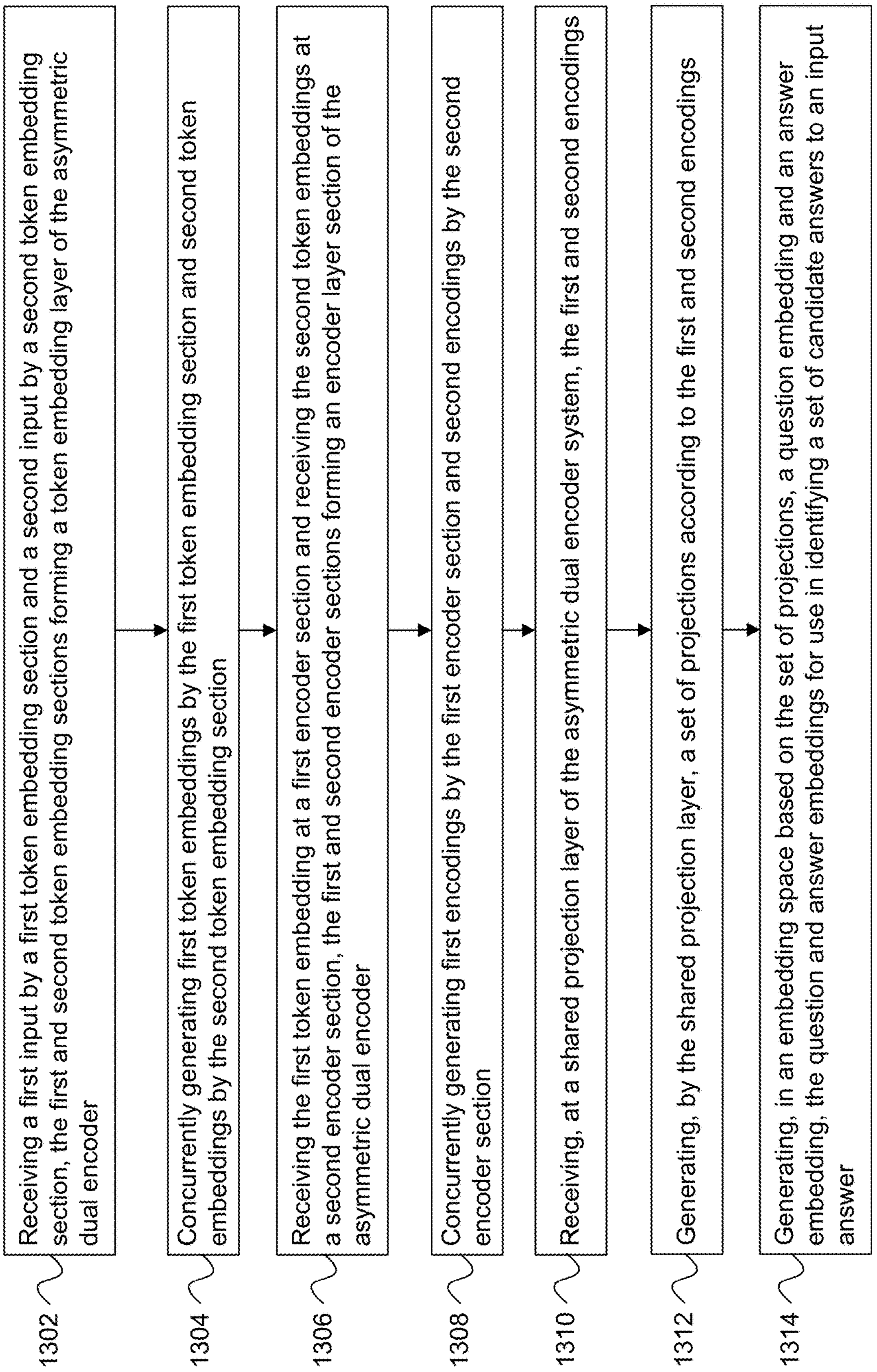
FIG. 13 illustrates an example method in accordance with aspects of the technology.

FIG. 13 illustrates an exemplary method 1300 implementing an asymmetric dual encoder. At block 1302 the method includes receiving a first input by a first token embedding section and a second input by a second token embedding section. The first and second token embedding sections form a token embedding layer of the asymmetric dual encoder. At block 1304, the method includes concurrently generating first token embeddings by the first token embedding section and second token embeddings by the second token embedding section. At block 1306 the method includes receiving the first token embedding at a first encoder section and receiving the second token embeddings at a second encoder section. The first and second encoder sections form an encoder layer section of the asymmetric dual encoder. At block 1308 the method includes concurrently generating first encodings by the first encoder section and second encodings by the second encoder section. At block 1310 the method includes receiving, at a shared projection layer of the asymmetric dual encoder system, the first and second encodings. At block 1312 the method includes generating, by the shared projection layer, a set of projections according to the first and second encodings. And at block 1314 the method includes generating, in an embedding space based on the set of projections, a question embedding and an answer embedding. The question and answer embeddings can then be used in identifying a set of candidate answers to an input answer.

As discussed above, it can be seen than sharing projection layer between the two encoders enables ADEs to perform competitively with SDEs. By directly probing the embedding space, it has been demonstrated that the shared projection layers map the embeddings of the two encoder towers into coinciding parameter spaces, which is highly beneficial for improving the retrieval quality of the dual encoder model. By way of example, the two encoder towers may implement a BERT-type encoder in one tower, and a visual-type encoder in the other tower. In one scenario, the asymmetric towers can model heterogeneous data (e.g., a text tower+a visual tower, a text tower+a multimodal tower, etc.). In another scenario, the system may employ encoders of different sizes (a small tower+a large tower).

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented asymmetric dual encoder system, comprising:

a token embedder layer section having a first token embedding section associated with a first input and a second token embedding section associated with a second input, wherein the first and second token embedding sections are distinctly parameterized;

an encoder layer section having a first encoder section configured to receive token embeddings from the first token embedding section and a second encoder section configured to receive token embeddings from the second token embedding section, wherein the first and second encoder sections are distinctly parameterized;

a projection layer configured to receive encodings from both the first and second encoder sections and to generate a set of projections, wherein the projection layer is shared by the asymmetric dual encoder system; and an embedding space configured, based on the set of projections, to generate a question embedding and an answer embedding, the question and answer embeddings for use in identifying a set of candidate answers to an input answer.

2. The computer-implemented asymmetric dual encoder system of claim 1, wherein the first input is a question and the second input is an answer.

3. The computer-implemented asymmetric dual encoder system of claim 1, wherein:

the asymmetric dual encoder system is configured to receive input from a mixed-input source, the first token embedding section is configured to receive the first input having a first type of input from the mixed-input source, and the second token embedding section is configured to receive the second input having a second type of input from the mixed-input source.

4. The computer-implemented asymmetric dual encoder system of claim 3, wherein the first type of input comprises text, and the second type of input does not include text.

5. The computer-implemented asymmetric dual encoder system of claim 4, wherein the second type of input includes at least one of imagery or audio.

6. The computer-implemented asymmetric dual encoder system of claim 4, wherein the second type of input includes a structured form.

7. The computer-implemented asymmetric dual encoder system of claim 1, wherein the first and second token embedding sections are initialized from a same set of pre-trained parameters, but are fine-tuned separately.

8. The computer-implemented asymmetric dual encoder system of claim 1, wherein the asymmetric dual encoder system is trained by optimizing contrastive loss with an in-batch sampled soft-max.

9. The computer-implemented asymmetric dual encoder system of claim 8, wherein cosine distance is used as a similarity function for the contrastive loss.

10. The computer-implemented asymmetric dual encoder system of claim 1, wherein during training the projection layer is randomly initialized.

11. The computer-implemented asymmetric dual encoder system of claim 1, wherein the token embedder layer section is configured to map the first and second inputs to the encoder layer section.

12. A method implementing an asymmetric dual encoder, the method comprising:

receiving a first input by a first token embedding section and a second input by a second token embedding section, the first and second token embedding sections forming a token embedding layer of the asymmetric dual encoder and being distinctly parameterized;

concurrently generating first token embeddings by the first token embedding section and second token embeddings by the second token embedding section;

receiving the first token embedding at a first encoder section and receiving the second token embeddings at a second encoder section, the first and second encoder sections forming an encoder layer section of the asymmetric dual encoder and being distinctly parameterized;

concurrently generating first encodings by the first encoder section and second encodings by the second encoder section;

receiving, at a shared projection layer of the asymmetric dual encoder, the first and second encodings;

generating, by the shared projection layer, a set of projections according to the first and second encodings; and generating, in an embedding space based on the set of projections, a question embedding and an answer embedding, the question and answer embeddings for use in identifying a set of candidate answers to an input answer.

13. The method of claim 12, wherein the first and second token embedding sections are initialized from a same set of pre-trained parameters, but are fine-tuned separately.

14. The method of claim 12, wherein the asymmetric dual encoder is trained by optimizing contrastive loss with an in-batch sampled soft-max.

15. The method of claim 12, wherein during training the projection layer is randomly initialized.

16. The method of claim 12, further comprising providing one or more of the set of candidate answers responsive to the input answer.

17. The method of claim 12, wherein at least one of the first and second inputs includes text.

18. The method of claim 12, wherein the first input includes text and the second input includes at least one of imagery, audio, or a structured form.

19. The method of claim 12, wherein at least one of the first and second inputs are associated with a webpage.

20. The method of claim 12, wherein the first input is associated with a different type of content than the second input.

21. A non-transitory recording medium having instructions stored thereon, the instructions, when executed by one or more processors of a computing system, implementing an asymmetric dual encoder comprising:

a token embedder layer section having a first token embedding section associated with a first input and a second token embedding section associated with a second input, wherein the first and second token embedding sections are distinctly parameterized;

an encoder layer section having a first encoder section configured to receive token embeddings from the first token embedding section and a second encoder section configured to receive token embeddings from the second token embedding section, wherein the first and second encoder sections are distinctly parameterized;

a projection layer configured to receive encodings from both the first and second encoder sections and to generate a set of projections, wherein the projection layer is shared by the asymmetric dual encoder; and an embedding space configured, based on the set of projections, to generate a question embedding and an answer embedding, the question and answer embeddings for use in identifying a set of candidate answers to an input answer.

* * * * *